United States Patent [19]

McGrath et al.

[11] Patent Number: 4,943,626
[45] Date of Patent: Jul. 24, 1990

[54] PRIMARY POLYETHER ACTIVE HYDROGEN COMPOUNDS WHICH ARE PREPARED FROM LINKED, PROTECTIVELY INITIATED POLYALKYLENEOXIDES

[75] Inventors: James E. McGrath; Youngtai Yoo, both of Blacksburg, Va.; Robert B. Turner; Diane M. Lewis, both of Lake Jackson, Tex.

[73] Assignee: The Dow Chemical Company, Midland, Mich.

[21] Appl. No.: 226,302

[22] Filed: Jul. 29, 1988

[51] Int. Cl.$^5$ .................... C08G 81/00; C08G 65/30; C08G 65/32
[52] U.S. Cl. .................... 528/408; 528/409; 528/413; 528/416; 528/76; 528/77; 528/78; 528/79; 525/403; 525/408; 525/409; 568/607; 568/618; 568/624; 558/276; 558/277; 560/26; 560/91; 560/158
[58] Field of Search ............... 568/618, 624; 528/408, 528/409, 413, 416; 525/403, 408, 409

[56] References Cited

U.S. PATENT DOCUMENTS

| | | | |
|---|---|---|---|
| 3,022,335 | 2/1962 | Lundsted | 536/120 |
| 3,036,118 | 5/1962 | Jackson et al. | 560/182 |
| 3,336,242 | 8/1967 | Hampton et al. | 521/174 |
| 3,359,217 | 12/1967 | Brandner | 521/159 |
| 3,393,243 | 7/1968 | Cuscurida | 568/620 |
| 3,446,757 | 5/1969 | Vandenberg | 528/421 |
| 3,879,475 | 4/1975 | Wojtowicz et al. | 568/618 |
| 3,951,888 | 4/1976 | Isayama et al. | 528/409 |
| 4,195,167 | 3/1980 | Knopf et al. | 528/408 |
| 4,297,482 | 10/1981 | Wood et al. | 528/405 |
| 4,299,993 | 11/1981 | Bethea et al. | 568/617 |
| 4,408,084 | 10/1983 | Langdon | 568/601 |
| 4,421,872 | 12/1983 | Buthe et al. | 521/174 |
| 4,440,705 | 4/1984 | Nissen et al. | 264/53 |
| 4,452,924 | 6/1984 | Radovich | 521/174 |
| 4,456,773 | 6/1984 | Fock | 568/608 |
| 4,581,470 | 4/1986 | Hoy et al. | 560/189 |
| 4,654,417 | 3/1987 | Inoue et al. | 528/416 |
| 4,703,069 | 10/1987 | Brown et al. | 521/174 |

FOREIGN PATENT DOCUMENTS 248651 12/1987 European Pat. Off. .

OTHER PUBLICATIONS

Aida, et al. *Macromolecules* 1981, 14, pp. 1162–1169.
ACS Symposium Series 286, James E. McGrath, ed., ACS (1985) pp. 1–21, 137–147 & 204–217.
Aida, et al., *Makromol, Chem. 182* (1981) pp. 1073–1079.
George Odian, Principles of Polymerization, 2nd Ed. (1970), pp. 512–521.
Youngtai Yoo & James E. McGrath, "Synthesis of Functionalized Poly(Propylene Oxide) Using Aluminum Porphyrin Catalysts", Dept. of Chemistry, Virginia Polytechnic Inst. & St. Univ.
Youngtai Yoo, et al. "Effect of Functional End Groups on Thermal Degradiation of Poly(Propylene Oxide)", Dept. of Chemistry, Virginia Polytechnic Inst. & St. Univ.

*Primary Examiner*—John Kight, III
*Assistant Examiner*—Frederick Krass
*Attorney, Agent, or Firm*—Carol J. Cavender; Barbara J. Sutherland

[57] ABSTRACT

Polyether active hydrogen compounds having at least two terminal active hydrogen groups on primary carbon atoms are prepared by (a) forming polyoxyalkylene molecules each having at least one active hydrogen precursor, (b) linking at least two of the polyoxyalkylene molecules, and (c) converting the active hydrogen precursor groups to active hydrogen groups on primary carbon atoms. The polyoxyalkylene molecule is formed by exposing a reaction mixture comprising at least one alkylene oxide and at least one protective initiator to conditions effective for the polymerization of the alkylene oxides. Linking is accomplished at polyether chain ends distal to the protected active hydrogen precursor groups, such that the active hydrogen precursors remain on the linked polyether chains until they are converted to active hydrogen groups. The process is particularly useful to produce polyether compounds having at least about 80 mole percent primary active hydrogen groups, which compounds are useful, for instance, in forming polyurethanes.

30 Claims, No Drawings

PRIMARY POLYETHER ACTIVE HYDROGEN COMPOUNDS WHICH ARE PREPARED FROM LINKED, PROTECTIVELY INITIATED POLYALKYLENEOXIDES

BACKGROUND OF THE INVENTION

This invention relates to the field of polyether active hydrogen compounds. More particularly, the invention relates to polyether compounds having at least two terminal active hydrogen groups, and preparation thereof.

An active hydrogen group is a functional group which will react with an isocyanate group. Polyfunctional compounds having active hydrogen groups are used, for instance, in the preparation of polyurethanes, which are polymers useful in producing foams, molded plastics and the like. The Zerewitinoff test described by Kohler in the *Journal of the American Chemical Society*, Vol. 49, page 3181 (1927) predicts the tendency of a hydrogen-containing group to react with isocyanates. Active hydrogen group-containing compounds include amines, alcohols, thiols, carboxylic acids, carboxamides and the like.

A polyether active hydrogen compound is a compound having more than one ether group as well as at least one active hydrogen group. Polyhydroxy polyethers are referred to as polyether polyols. Polyether compounds are commonly prepared by the catalyzed addition of an alkylene oxide, a sequence of alkylene oxides or a mixture of alkylene oxides to an organic initiator compound advantageously having at least two active hydrogen atoms. Such addition of alkylene oxides is referred to as alkoxylation. An alkoxylation catalyst may be alkaline, neutral or acid. In a commercial operation, the usual catalysts are either sodium hydroxide or potassium hydroxide. The use of catalysts which are the reaction product of a porphyrin compound and an organoaluminum compound is also known for production of polyether polyols as described in U.S. Pat. No. 4,654,417.

Whatever the catalyst used to prepare polyether polyols from alkylene oxides, alkylene oxides having one or more alkyl substituents, such as propylene oxide, butylene oxide, and the like, show a strong tendency to react with active hydrogen compounds at the least substituted carbon of the epoxy ring, such that terminal secondary or tertiary hydroxyl groups are formed. Primary hydroxyl groups are, however, more reactive with isocyanate groups than are secondary and tertiary hydroxyl groups. Compounds having primary hydroxyl groups are, therefore, generally preferred for preparation of polyurethanes, when fast reaction is desirable, for instance in preparing molded polyurethanes, particularly reaction injection molded (RIM) polyurethanes.

Ethylene oxide is often used to produce primary hydroxyl groups in the form of terminal hydroxyethoxy groups. Ethoxy groups in a polyether polyol generally increase a molecule's tendency to absorb water, e.g. moisture from the air. Polyurethanes formed from polyols having ethoxy units often absorb enough water, e.g. from humid air, to change the physical properties of a polyurethane. For instance, a polyurethane foam that absorbs moisture generally becomes soft, and may swell and demonstrate reduced load-bearing properties. High levels of ethylene oxide repeating units may also cause a polyether to be more crystalline.

One way to avoid the problems of water absorption of poly(ethylene oxide)-containing polyols, yet have terminal primary hydroxyl groups, is to form a polyether from alkylene oxides other than ethylene oxide and cap that polyether with at least one ethylene oxide unit as described, for instance, in U.S. Pat. Nos. 3,336,242; 3,776,862; 4,195,167; 4,421,872; 4,299,993; and 4,440,705. Because a polyether polyol having a primary hydroxyl group is more reactive with ethylene oxide than is a secondary or tertiary hydroxyl group, ethylene oxide molecules tend to add preferentially to molecules already having hydroxyethoxy groups rather than adding to polyethers having secondary or tertiary hydroxyl groups. Thus, the product of capping polyethers with ethylene oxide is generally a mixture of polyethers having one or more polyethoxy terminal segments with some of the polyethers having one or more terminal segments without hydroxyethoxy groups, thus, without primary hydroxyl groups. For instance, in a process for ethylene oxide capping of a poly(propylene oxide) polyol, wherein about 3 percent potassium hydroxide is used as catalyst and a polyol having an equivalent weight of approximately 2000 is produced, those skilled in the art would expect that capping about 70-80% of the poly(propylene oxide) chains would require use of about 15-20% by weight ethylene oxide based on total alkylene oxides. Capping of 80-85% of the poly(propylene oxide) chains would require that about 20-25 % by weight of the alkylene oxide be ethylene oxide. For purposes of the foregoing discussion, a polymer chain is that portion of a polyether polyol molecule initiated at one active hydrogen group of an initiator and terminated by a hydroxyl group.

It would be useful to prepare polyether compounds having active hydrogen groups on primary carbon atoms without ethylene oxide capping.

SUMMARY OF THE INVENTION

In one aspect, the invention is a process for producing a polyether active hydrogen compound having at least two active hydrogen groups on primary carbon atoms per molecule comprising (a) forming polyoxyalkylene molecules each having at least one active hydrogen precursor group, by exposing a reaction mixture containing at least one 1,2-epoxyalkane and at least one protective initiator to conditions effective for the polymerization of the 1,2-epoxyalkane; (b) linking at least two of the polyoxyalkylene molecules using a linking agent to form a linked molecule having at least two termini each having an active hydrogen precursor group thereon; and (c) converting the active hydrogen precursor groups at said termini of the linked molecule to active hydrogen groups on primary carbon atoms.

In another aspect, the invention is a process for producing a polyether active hydrogen compound having at least two terminal active hydrogen groups on primary carbon atoms per molecule comprising (a) forming polyoxyalkylene molecules each having at least one active hydrogen precursor group, by exposing a reaction mixture comprising at least one substituted alkylene oxide and at least one intramolecular protective initiator having a functional group convertible into an active hydrogen group on a primary carbon atom to conditions effective for the polymerization of the substituted alkylene oxide; (b) linking at least two of the polyoxyalkylene molecules using a linking agent to form a linked molecule having at least two termini each having an active hydrogen precursor group thereon; and (c) converting the active hydrogen precursor groups at said termini of the linked molecule to active hydrogen groups on primary carbon atoms.

In yet another aspect, the invention is a composition of matter comprising a mixture of polyether active hydrogen compounds having terminal hydroxyl, thiol, primary amine or secondary amine groups, at least about 90 mole percent of which groups are on methylene carbons, said polyether active hydrogen compounds being produced from at least one substituted 1,2-epoxyalkane and from 0 to about 25 weight percent ethylene oxide based on combined weight of ethylene oxide and substituted 1,2-epoxyalkane.

Practice of the invention yields polyether compounds having at least two terminal active hydrogen groups on primary carbon atoms on poly(alkylene oxide) molecules.

DETAILED DESCRIPTION OF THE INVENTION

In the practice of the invention, a protective initiator is used to initiate polymerization of an alkylene oxide to form a polyether, or polyoxyalkylene, chain having a protected active hydrogen precursor. At least two such polyether chains are linked at termini distal from the precursors before the precursors are converted into active hydrogen groups such that polyfunctional polyether active hydrogen compounds are formed.

The term "protective initiator" is used herein to designate a compound which both initiates polymerization of a alkylene oxide and provides a precursor for conversion into an active hydrogen group.

A suitable protective initiator forms a protective group which is convertible to an active hydrogen group without substantial cleavage of ether linkages (or —O—C— bonds) of the polyether chain. Preferably less than about 5 percent by weight of the polyether molecules present, more preferably less than 1 percent by weight of the polyethers molecules present have at least one ether linkage cleaved. A functional group which is cleavable to produce an active hydrogen group without substantial cleavage of a poly(alkylene oxide) chain is referred to herein as "easily cleavable."

Protective initiators suitable for use in the practice of the invention can be categorized into two general types. One type is referred to herein as an attachment protective initiator, and the other, as an intramolecular protective initiator.

An attachment protective initiator is a compound which reacts with an alkylene oxide such that an active hydrogen precursor is formed at the site of attachment between the protective initiator and the alkylene oxide. Suitable attachment protective initiators include compounds which react with an alkylene oxide to form easily cleavable ethers (such as optionally substituted benzyl ethers, α,β-ethylenically unsaturated ethers, tertiary butyl ethers, triphenylmethyl ethers and the like), acetals or ketals, substituted silyl groups or carboxylic acid esters (such as acetates, benzoates, t-butyl esters and the like) and the like, as well as the corresponding thioethers, thioacetals, thioketals, thioesters, amines, amides and the like. Formation and removal of such groups is known to those skilled in the art and is discussed, for instance, in C. B. Reese, *Protective Groups in Organic Chemistry*. Ed. J. F. W. McOmie, Plenum Press, London, 1973, 43–144, 235–308, which is incorporated herein by reference in its entirety.

Exemplary of attachment protective initiators are alcohols, thiols, amines, phenols and thiophenols, alkyl and arylalkyl amines, such as benzyl alcohol, inertly substituted benzyl alcohols, tetrahydropyranyl alcohol, methoxy methyl alcohol, t-butyl alcohol, isopropylidene alcohol, triarylmethylene alcohols, allyl alcohol, the corresponding thiols and amines and the like. Preferably the attachment protective initiators are benzyl, substituted benzyl or isopropylidene alcohols or thiols, more preferably benzyl or substituted benzyl alcohols or thiols.

The attachment protective initiators are unsubstituted or inertly substituted. The term "inertly substituted" is used to designate functional groups which do not undesirably interfere with a reaction used to produce polyether active hydrogen compounds by the process of the invention or undesirably react with a compound present in said reactions, including polymerization of alkylene oxide and removal of the protective group. Exemplary inert groups advantageously include alkyl groups including cycloalkyl groups, aryl groups, aralkyl groups, fluorine, bromine, chlorine, iodine, ether groups, such as alkoxy, cycloalkoxy, aryloxy and aralkoxy groups, ester groups, furanyl groups, pyranyl groups, nitrile groups, alkenyl groups, alkynyl groups, diazo groups, imine groups, nitro groups, azomethane groups, thiosulfate groups and the like. Inert groups containing carbon atoms are advantageously selected such that they do not substantially sterically hinder reactions at nearby reaction sites and advantageously have from about one to about 8 carbon atoms, preferably from about one to about 4 carbon atoms.

An intramolecular protective initiator is a protective initiator having, as part of the initiator molecule, an active hydrogen precursor group. Suitable intramolecular protective initiators include compounds which have internal functional groups which can be converted into active hydrogen groups such as compounds having easily cleavable ether groups (such as optionally substituted benzyl ethers, α,β-ethylenically unsaturated ethers, tertiary butyl ethers, triphenylmethyl ethers and the like), acetal or ketal groups, substituted silyl groups or carboxylic acid ester groups (such as acetates, benzoates, t-butyl esters and the like) and the like, as well as the corresponding thioethers, thioacetals, thioketals, thioesters, amines, amides and the like. Intramolecular protective initiators are unsubstituted or inertly substituted.

Preferred intramolecular protective initiators are the ethers, amines or thioethers of active carbon groups or active silicon groups. More preferably, the ether or thioether is one having a methylene group bonded to the oxygen, nitrogen or sulfur atom to which the active carbon group or active silicon group is also bonded. Active carbon and active silicon groups are easily cleaved from such compounds to leave amine, hydroxyl or thiol groups on primary carbon atoms. Active carbon groups include triphenylmethyl groups [$(C_6H_5)_3C-$], tertiary butyl groups, electronegatively substituted aryl groups such as phenyl groups substituted with $NO_2$, $SO_2$ or CN groups and the like. Active silicon groups are advantageously triarylsilyl, wherein the aryl group preferably has from about six to about 15 carbon atoms and is unsubstituted or inertly substituted.

Such protective initiators are exemplified by 1-triphenylmethoxy-2-propanol, 1-triphenylsiloxy-2,3-propanol, 1-tri(4-methylphenyl)methoxy-4-heptanol, 1-(3-nitrophenoxy)-4-pentanol, 1-triphenylmethoxy- 6dodecylamine, 1-tertiary butoxy-2-n-docosanol, 8-chloro-1-(4-methylsulfonylphenoxy)-2-n-eicosane, 4-(2hydroxybutoxy) phenylnitrile, 1-tri(2-methoxyphenyl) siloxy-4-n-undecanol, 1-(1,1-dichloro-2-dimethylethoxy)-5-pentylamine, 1-tri(3-trichloromethylphenyl) methoxy-2-methyl-3-butylamine, 1-tertiary butoxy-2-(2-ethoxyethoxy)-2-propanol, 1-triphneylmethoxy-2-[2-methyl-2-(2-methylethoxy)ethoxy]-2-propanol, 1-triphenylmethoxy-3,6-dioxa-2,5-dimethyl-8-nonanol, 3,5,7-trichloro-1-tertiary butoxy-8-decanol, 1-triphenylmethylthio-2-propanol, 1-tri(4-methylphenyl) methylthio-4-heptanol, 1-(3-nitrophenylthio)-4-pentanol, 1-triphenylmethylthio-6-dodecylamine, 1-tertiary butylthio-2-n-docosanol, 8-chloro-1-(4-methylsulfonylphenylthio)-2-n-eicosane, 4-(2-hydroxybutylthio) phenylnitrile and the like.

Such preferred ether or thioether intramolecular protective initiators are advantageously formed as reaction products of an active carbon or active silicon halide, such as a triaryl carbon or silicon halide (e.g. triphenylmethyl chloride, triphenylsilyl chloride, triphenylmethyl bromide and the like), a tertiary butyl halide (e.g tertiary butyl chloride and the like) or an aromatic halide having electronegative substitution (e.g. chloronitrobenzene, chlorocyanobenzene and the like) with a polyfunctional active hydrogen compound (e.g. a diol, dithiol, diamine, triamine, triol, trithiol, aminoalcohol or similar compound). The polyfunctional active hydrogen compound preferably has at least one primary active hydrogen group, and is, more preferably, also a glycol or glycerine.

Protective initiators of either type having one or more functional groups which initiate alkylene oxide polymerization are suitable for use in the practice of the invention. When there is more than one such functional group, more than one polyether chain is initiated. In contrast to processes known in the art for forming polyether polyols, in which each initiator molecule initiates more than one polyether chain, preferred protective initiators for use in the practice of the present invention initiate a single polyether chain.

For relative ease in preparation of the polyfunctional active hydrogen compounds, the protective initiator is preferably an attachment initiator which is an alkyl, cycloalkyl, aryl, or aralkyl alcohol, amine or thiol having from about 1 to about 13 carbon atoms, preferably from about 7 to about 11 carbon atoms and most preferably from about 7 to about 9 carbon atoms. Aralkyl alcohols and thiols are, in most cases, facile initiators as well as easily cleaved from polyether chains to form polyethers having hydroxyl groups. Aralkyl alcohols and thiols are, therefore, preferred protective initiators. Representative examples of such alcohols are benzyl alcohol, benzyl alcohols substituted with inert groups such as lower alkyl groups of from about one to about 10 carbon atoms such as methyl, ethyl, tertiary butyl groups and the like, chloro groups, nitro groups, and the like. Benzyl alcohols and (inertly) substituted benzyl alcohols are the more preferred protective initiators.

Polyether chains are advantageously formed by polymerization of one or more alkylene oxide molecules of the formula:

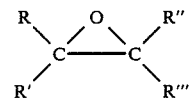

Formula I wherein R, R', R" and R''' (referred to hereinafter as R groups) are independently hydrogen or inert groups, that is, groups which do not react with epoxy groups or interfere undesirably with the polymerization thereof under conditions effective for polymerization of the alkylene oxides. Suitable inert groups include, for instance, halogens, alkyl, aryl, aralkyl, cycloalkyl, alkoxy, aryloxy, aralkoxy or cycloalkoxy groups, which groups are unsubstituted or inertly substituted, that is substituted by inert groups. Each R group preferably has fewer than about 15 carbon atoms. Suitable halogens are chlorine, bromine, fluorine and iodine.

Preferably, the alkylene oxides used in the practice of the invention have at least one R group which is unsubstituted or inertly substituted and is an alkyl or alkoxy group having from about one to about six carbon atoms, an aryl or aryloxy group having from about six to about ten carbon atoms, an aralkyl or aralkoxy group having about seven to about twelve carbon atoms or a cycloalkyl or cycloalkoxy group having from about three to about six carbon atoms. More preferably, the R groups are hydrogen or the unsubstituted preferred groups.

Alkylene oxides of Formula I wherein at least one of R, R', R" or R''' is other than hydrogen are referred to herein as substituted alkylene oxides. While all alkylene oxides are suitable for use in the practice of the invention, substituted alkylene oxides are preferred. When intramolecular protective initiators are used, any substituted alkylene oxide is useful for preparing polyethers having primary active hydrogen groups. Such initiators can provide a primary active hydrogen precursor; therefore, it is not necessary that the alkylene oxide provide a methylene group for attachment of the active hydrogen group.

When attachment protective initiators are used, however, alkylene oxides having a ring methylene (—CH2—) group are preferred to provide a site for subsequent generation of a primary active hydrogen group. Such alkylene oxides, those of Formula I wherein both R and R' and/or both R" and R''' are hydrogen, are referred to herein as 1,2-epoxyalkanes. Such 1,2-epoxyalkanes are suitable for use in the practice of the invention. Preferably, the 1,2-epoxyalkanes are substituted 1,2-epoxyalkanes, that is alkylene oxides of Formula I wherein both R and R' or both R" and R''', but not all of the R groups are hydrogen.

Substituted 1,2-epoxyalkanes are exemplified by propylene oxide, 1,2-butylene oxide, 1,2-hexylene oxide, 1,2-decene oxide, 2-methoxy propylene oxide, methoxy ethylene oxide, styrene oxide and the like. Halogenated 1,2-epoxyalkanes are also suitable, although not preferred, and are exemplified by epichlorohydrin, epiiodohydrin, epibromohydrin, 3,3-dichloropropylene oxide, 3-chloro-1,2-epoxypropane, 3-chloro-1,2-epoxybutane, 3,4-dichloro-1,2-epoxybutane, 3,3,3-trichloropropylene oxide and the like. Other suitable substituted alkylene oxides include, for instance, 2,3-butylene oxide, 2,3-hexylene oxide, 3,4-decene oxide, 1,1,1-trifluoromethyl 2,3-epoxyoctane and the like. Propylene oxide, 1,2-butylene oxide and mixtures thereof are preferred, with propylene oxide more preferred.

More than one alkylene oxide is suitably used either in mixture or sequentially. When more than one alkylene oxide is used, resulting polyether polyols can contain random, block or random and block distributions of monomers. Mixtures of alkylene oxides most often produce randomly distributed alkylene oxide units. Sequential addition of different alkylene oxides most often produces blocks of the alkylene oxide segments in a polyether chain. Mixtures preferably contain at least about 75, more preferably at least about 90, and most preferably at least about 95 percent of a preferred alkylene oxide.

Although substituted alkylene oxides including substituted 1,2-epoxyalkanes are preferably used to prepare the polyether polyols of the invention, some ethylene oxide is, optionally, used. When ethylene oxide is used, it is preferably used in admixture with other alkylene oxides such that there are randomly distributed ethoxy units in the resulting polyether backbone, rather than polyethoxy blocks at the termini of the polyether. When ethylene oxide is used in sequence with another alkylene oxide, it is preferably used such that blocks of ethoxy groups are internal, rather than on the termini of the polyether molecules. In some applications of polyether active hydrogen compounds, such as certain polyols used in forming polyurethanes, ethoxy units are needed to achieve desired processing properties and/or desired physical properties in a polyurethane. Although up to about 30 weight percent ethylene oxide based on the weight of a mixture of alkylene oxides is suitably used in the practice of the invention, preferably less than about 10 weight percent, more preferably less than about 5 weight percent ethylene oxide is used in an alkylene oxide mixture. To avoid water absorption, most preferably no ethylene oxide is used in the practice of the invention. At least about 80 percent, preferably at least about 85 percent, more preferably at least about 90 percent, most preferably at least about 95 percent of the polyether chains on polyols and polythiols produced according to the practice of the invention have primary hydroxyl or thiol groups even when less than about 25 percent, preferably less than about 20 percent, most preferably less than about 10 percent by weight ethylene oxide is used in a mixture of alkylene oxides.

Polymerization of a 1,2-epoxyalkane in the presence of a monofunctional, active hydrogen group-containing, attachment protective initiator is represented schematically by

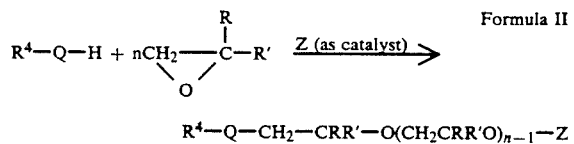

Formula II $R^4-Q-CH_2-CRR'-O(CH_2CRR'O)_{n-1}-Z$ wherein R' and R" are as defined for Formula I; n is a positive number equal to or greater than one representing the number of alkylene oxide molecules polymerized per chain; Z is a group formed at the propagating end of a polyether chain, such as a catalyst residue or the hydrogen atom that replaces such a catalyst group; Q schematically represents a molecular site reactive with an alkylene oxide and subsequently convertible into an active hydrogen group; $R^4$ schematically represents the remainder of an initiator molecule. $R^4-Q-$ is, thus, an active hydrogen precursor. Advantageously, Q is O, S, NH or $NR^a$, wherein $R^a$ is any aryl, alkyl, aralkyl or cylcoalkyl group which is unsubstituted or inertly substituted, and to avoid steric hinderance, preferably has from about 1 to about 25 carbon atoms. In the preparation of an active hydrogen group, $R^a$ suitably remains on the nitrogen atom or is removed therefrom.

Exemplary of the structural representations of Formula II is the use of benzyl alcohol as an attachment protective initiator for polymerization of propylene oxide. In that case, $R^4$- represents the benzyl group; —Q— is —O—; R' is hydrogen and R" is methyl.

When Z is a catalyst residue, organoaluminum porphyrin complexes, Lewis acid compounds, alkoxide anions, alkali metal ions, alkaline earth metal complexes or other organometallic residues and the like are exemplary of Z. Processes for polymerization of alkylene oxides advantageously include a step in which the catalyst residue is replaced by H. In some such processes, it is replacement of a catalyst residue by H that terminates the polymerization reaction. Alternatively, the catalyst residue may be replaced by a hydrogen atom by, e.g. acid treatment.

As illustrated in Formula II, an initiator generally adds preferentially to the less substituted position of an alkylene oxide, that is a methylene group of a substituted 1,2-epoxyalkane. In the case of an attachment protective initiator, then, the active hydrogen precursor bonds to the methylene group. Reaction at the methylene group and blocking of subsequent addition of alkylene oxides to that position forces polymerization to occur at the more substituted position. After polymerization of substituted 1,2-epoxyalkanes and subsequent reactions, the active hydrogen precursor is converted to an active hydrogen group attached to a —CH$_2$— group, that is a primary active hydrogen group.

The case of an intramolecular protective initiator which supplies the methylene group for a primary active hydrogen group is illustrated by:

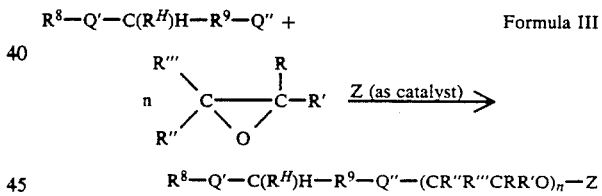

Formula III $R^8-Q'-C(R^H)H-R^9-Q''-(CR''R'''CRR'O)_n-Z$ wherein R, R', R" and R''' are as defined for Formula I; n and Z are as defined for Formula II; Q' is any group convertible into an active hydrogen group; Q" is any group which initiates polymerization of an alkylene oxide; $R^8$ schematically represents any portion(s) of a intramolecular protective initiator which are removed from a polyether chain in the conversion of Q' to an active hydrogen group; $R^H$ represents hydrogen, a group which is replaced by a hydrogen in the conversion of Q' to an active hydrogen group or a valence of the carbon atom which is filled by a hydrogen atom in the conversion of Q'; and $R^9$ schematically represents any portion(s) of the intramolecular protective initiator which remain with the polyether chain after the conversion of Q' to an active hydrogen group. Together, $R^8-Q'-$, thus, represents an active hydrogen precursor such as an ether group, a thioether group, a nitro group, an acetal, a secondary or tertiary amine and the like. $R^H$ is preferably hydrogen.

Exemplary of the structural representations of Formula III is the use of the reaction product of triphenylmethyl chloride and 1,2-propane diol, that is, 1-triphenylmethoxy-2-propanol as an intramolecular protective initiator for polymerization of propylene oxide. In that case, $R^8$— represents the triphenylmethyl group; $Q'$ is O; RH is hydrogen; —$R^9$— is —CH(CH$_3$)—; $Q''$ is 0; $R''$, $R'''$ and $R'$ are hydrogen and R is methyl.

The average length of a polyalkylene oxide chain, as indicated by n, is subject to wide variation in direct proportion to the amount of reactant monomer utilized. The extent of polymerization is generally limited, however, by the occurrence of chain termination, monomer isomerization or catalyst deactivation reactions which take place during the polymerization process. The number average of oxyalkylene groups per molecule of alcohol represents a number average over a large number of molecules, with a given polyether product having a certain percentage of chains of both longer and shorter length. Preferably, in the practice of this invention, n is from about 2 to about 1000, more preferably from about 15 to about 150, more preferably from about 15 to about 50, for each polyether chain attached to an active hydrogen group on a resulting polyfunctional active hydrogen compound.

Each

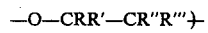  Formula IV unit in Formula III is referred to herein as an alkoxy or oxyalkylene group, or as an alkylene oxide unit.

For convenience, a polyether chain having an active hydrogen precursor on one terminus thereof and an OH group or catalyst group on the distal terminus thereof is schematically represented as:

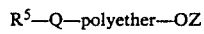  Formula V wherein $R^5$—Q— is used to schematically represent all active hydrogen precursor groups including those structures schematically represented by $R^4$—Q— in Formula II and $R^8$—$Q'$— in Formula III; -polyether- represents the poly(alkylene oxide) chain as well as any portion of an initiator molecule which remains on the poly(alkylene oxide) chain after conversion of Q to an active hydrogen group; and other symbols are as defined for Formulas II and III.

To prepare polyether chains as illustrated in Formulas II and III, the protective initiator and alkylene oxide are contacted under conditions effective for polymerization of alkylene oxides. Those conditions include conditions known in the art for such polymerizations. The polymerizations may be carried out in the presence of suitable adjuvants, solvents, stabilizers and catalysts including those known in the art.

One or more catalysts are advantageously used. Conventional catalysts include alkali or alkaline earth metals or their corresponding hydroxides and alkoxides, Lewis acids, crown ethers, mineral acids, cryptates and the like. One skilled in the art can readily determine suitable amounts of alkylene oxides, initiators, catalysts and adjuvants as well as suitable process conditions for polymerizing the alkylene oxides. Sources of detail regarding polymerization of alkylene oxides include J. Furukawa and T. Saegusa, "Polymerization of Aldehydes and Oxides," Interscience, New York (1963), pp. 125–208; G. Odian, "Principles of Polymerization," John Wiley & Sons, New York (2nd ed. 1970) pp. 512–521; J. McGrath, ed. "Ring-Opening Polymerization, Kinetics Mechanisms, and Synthesis," American Chemical Society, Washington, D.C. (1985) pp. 9–21, 137–147 and 204–217 and U.S. Pat. Nos. 2,716,137; 3,317,508; 3,359,217; 3,730,922; 4,118,426; 4,228,310; 4,239,907; 4,282,387; 4,3326,047; 4,446,313; 4,453,022; 4,483,941 and 4,540,828 which are incorporated herein by reference in their entirety.

Catalysts such as metals, their hydroxides and alkoxides, which tend to promote polyethylene chains having a head to tail sequence of alkylene oxide units are preferred over catalysts such as acids which tend to promote a random orientation of alkylene oxide units in a polyether. A head to tail sequence is joining of each methylene carbon of one substituted 1,2-epoxyalkane unit to the secondary or tertiary oxygen of a previous substituted 1,2-epoxy alkane unit.

Such preferred catalysts include hydroxides and alkoxides of alkali and alkaline earth metals, particularly calcium, strontium, barium, sodium, potassium and lithium. Potassium hydroxide is more preferred. When alkoxides are used as catalysts, the alkoxy groups advantageously contain from about one to about 36 carbon atoms. Exemplary of such alkoxides are alkoxides having anions of propylene glycol, glycerine, dipropylene glycol, propoxylated propylene or ethylene glycols and the like.

Most preferred as catalysts for use in the practice of the invention are reaction products of porphyrin compounds and organoaluminum compounds as described in U.S. Pat. No. 4,654,417 which is incorporated by reference herein in its entirety. Such catalysts are prepared from porphyrins advantageously having alkyl, aryl, aralkyl, alkylaryl, or cycloalkyl groups on from about zero to about 12 carbons on the porphyrin ring, preferably on from about one to about 8 ring carbon atoms, more preferably on from about four to about 8 of the ring carbon atoms. Such substitution is advantageously on the 5, 10, 15, 20 positions or the 2, 3, 7, 8, 12, 13, 17, 18 positions thereof. When the substituents are alkyl groups, they may be linear or branched, are unsubstituted or inertly substituted, and advantageously have from 1 to about 7 carbon atoms per group. Particularly useful are porphyrin compounds wherein the 5, 10, 15 and 20 positions are substituted by unsubstituted or inertly substituted aryl groups, such as unsubstituted or inertly substituted phenyl groups, and other ring carbons have hydrogen substituents. The aryl groups preferably have from about 6 to about 15 carbon atoms.

Porphyrin compounds useful in forming these catalysts include, for instance, tetramethyltetraethylporphyrin, octaethylporphyrin and tetraphenylporphyrin. Tetraphenylporphyrin and derivatives thereof wherein the phenyl group is inertly substituted are most preferred.

Porphyrin catalysts are preferred because they are suitable for producing polyether chains, particularly poly(propylene oxide) chains, having a very low degree of unsaturation in the polyether active hydrogen chains. Unsaturation results in broader molecular weight distribution in product and in limitations of polymer hydroxyl equivalent weight. Unsaturation also reduces the active hydrogen functionality of the product and often reduces the stability of the product, especially in the presence of heat. Other catalysts and processes which produce low degrees of unsaturation are also preferred for use in the practice of the invention. Preferably, the product polyfunctional active hydrogen compound has less than about 0.2 milliequivalent per gram (meq./g), more preferably from about 0.0 to about 0.1 meq/g, most preferably no detectable unsaturation, as detected by Nuclear Magnetic Resonance (NMR) or titration using, e.g. mercuric acetate.

Whether a catalyst is a porphyrin complex or other catalyst, the molar ratio of catalyst to alkylene oxide is advantageously from about 1:10 to about 1:3000; preferably about 1:10 to about 1:2000; and, most preferably, from about 1:10 to about 1:1000. Polymerizations of alkylene oxides are advantageously conducted at temperatures of from about 20° to about 150° C., preferably from about 50 to about 130° C. and, most preferably, from about 50° C. to about 110° C. The reactions are advantageously conducted at atmospheric or superatmospheric pressures. When a volatile alkylene oxide is employed, the reactions are advantageously conducted in a closed vessel at the pressure generated by the alkylene oxide at the temperature employed. Thus, the reaction pressure advantageously ranges from atmospheric pressure up to a pressure of about 1,000 psig. Preferably the pressure is from about 5 to about 100 psig (about 0.35 to about 6.8 atmospheres gauge) and most preferably from about 50 to about 80 psig (about 3.4 to about 5.4 atmospheres gauge). An inert atmosphere is preferably used, to produce active hydrogen compounds exhibiting little degradation or side reactions as evidenced by discoloration or odor. Inert atmospheres include nitrogen, helium, argon and the like.

After formation of polyether chains, at least two of said structures are linked together to form polyether molecules having more than one active hydrogen precursor. The structures are suitably linked in any manner that produces molecules having an average of more than one active hydrogen precursor per molecule. Advantageously, a linking agent is used.

A linking agent is any compound having a molecular structure suitable for reacting with termini of the polyether structures such that more than one of the structures are joined together. A linking agent reacts with a terminus of more than one polyether structure. For instance, the linkage may be formed by chemically bonding each of the oxygen atoms of the terminal groups represented by —OZ in Formula V to a terminus of a linking agent or residue thereof or, alternatively, by replacement of the groups represented by —OZ of at least 2 polyether chains by functional groups of a linking agent. Linking agents for use in the practice of the invention are selected such that when they are to be reacted with catalyst residue groups (as represented by —OZ in Formula V), they do not react with groups at the opposite terminus (as represented by $R^5$—Q in Formula V).

Linking agents advantageously have from about 1 to about 50 carbon atoms; are unsubstituted or inertly substituted; and, preferably, are polyfunctional, including di-functional, compounds known to be reactive with hydroxyl groups, such as polyfunctional acid halides, polyfunctional isocyanates and the like. Preferably, poly-functional acid chlorides are used. Exemplary linking agents include phthaloyl chloride, terephthaloyl chloride, phosgene, toluene diisocyanates, diphenylmethane diisocyanate, tris (6-isocyanatohexamethylene) urea, tris (4-isocyanatophenyl) methane, tris (4-isocyanatophenyl) thiophosphate, 4-isocyanatophenyl 4-isocyanatobenzoate and the like. Additional detail regarding exemplary halide and isocyanate linking agents and processes for their use are available in U.S. Pat. Nos. 3,951,888 and 4,452,924, which are incorporated by reference herein in their entirety.

Those skilled in the art are familiar with reaction conditions suitable for such reactions between such linking groups and groups represented by —OZ. Advantageously, the reactions are carried out at ambient temperatures and pressures. When temperatures higher than room temperature are used, inert atmospheres are generally advantageous. Temperatures between about 0° C. and 150° C. are generally suitable, with about 25° C. to 50° C. preferable. Catalysts known in the art for such reactions are often advantageous, such as triethylamine and the like.

Polyether chains each having a single terminal active hydrogen precursor and linked by reaction at —OZ are schematically represented by:

$$\text{LA}\text{-}(\text{O—polyether—Q—R}^5)_r \qquad \text{Formula VI}$$

wherein LA schematically represents a portion of the linking agent remaining after reaction with the polyether molecules, referred to herein as linking agent residue: —O—polyether—Q—$R^5$ represents a polyether chain having a terminal active hydrogen precursor as defined for Formula V: and r is a positive number representing the (average) number of polyether molecules with which each linking agent reacts. Thus, in the ideal case, r also represents the number of functional groups on a linking agent reactive with functional groups represented by —OZ. For use in producing active hydrogen compounds for preparing polyurethanes, r is preferably from about 2 to about 10, more preferably from about 2 to about 5, most preferably from about 2 to about 3. There is advantageously one linking agent residue per resultant polyether active hydrogen compound molecule.

Linked polyether molecules produced in the process of the invention have terminal active hydrogen precursors. Methods of converting the precursor groups to active hydrogen groups depend on the chemical nature of the active hydrogen precursor. Advantageously, chemical processes such as hydrolysis, hydrogenolysis, hydrogenation, acidification, oxidation, reduction, treatment with sodium in liquid ammonia and the like are used for conversion. A process used for conversion of protective groups is advantageously selected such that the process does not substantially cleave ether linkages or bonds formed between linking group and polyether chains, or otherwise result in molecular change other than conversion of the active hydrogen precursor to an active hydrogen group. The terms "convert" and "conversion" are used to include cleavage of a protective group, e.g. from an oxygen, nitrogen or sulfur atom, to leave an active hydrogen group and other transformations of the precursor into an active hydrogen group. The term "transformation" is used to indicate any conversion of an active hydrogen precursor into an active hydrogen group other than cleavage. For instance, a nitro group may be transformed into an amine by reduction; an aldehyde may be transformed into a hydroxyl group by reduction and the like. Preferably, the active hydrogen precursor is converted into a thiol or hydroxyl group, more preferably a hydroxyl group.

The practice of the invention is particularly advantageous for preparation of active hydrogen groups wherein the oxygen, sulfur or nitrogen atom of the active hydrogen group is supplied by the protective initiator rather than in subsequent reactions. For instance, an amine-terminated polyether is prepared by using a nitrogen-containing protective initiator and subsequent conversion thereof, rather than by amination of a polyol.

In the case of the preferred protective initiators which produce, optionally substituted, benzyl ethers, hydrogenolysis is representative of a suitable process for removing the benzyl groups. Hydrogenolysis is the process of bond cleavage and replacement of a substituent with hydrogen accomplished by introduction of gaseous hydrogen into a solution of the benzyl ether-containing molecule at a temperature and pressure effective for removal of the benzyl group, advantageously ambient temperature and pressure Alternatively, the benzyl ether may be treated with sodium in liquid ammonia to form a polyether polyol, for instance by the process taught by E. J. Reist V. J. Bartuska L. Goodman in *J. Org. Chem.* 29 3725 (1964).

Other protective groups are converted by processes known in the art. For instance, tetrahydropyran ether groups are conveniently converted by the process described by H. B. Henbest, et al. in *J. Chem. Soc.*, 3646 (1950). Methoxymethyl ether groups are conveniently converted by the process described by M. A. Abdel-Rahman, et al. in *J. Med. Chem.* 9 1 (1965). Triarylmethyl ether groups are conveniently converted by the process described by A. M. Michelson, et al. in *J. Chem. Soc.* 3459 (1956). Benzyl ether groups are conveniently converted by the process described by L. Knof in *Justus Liebigs Ann. Chem.* 656. 183 (1962). Isopropylidene groups are conveniently converted by the process described by S. D. Sabnis, et al. in *J. Chem. Soc.* 2477 (1963). Additional detail on use and removal of protecting groups is available in such references as R. K. Mackie and D. M. Smith, *Guidebook for Organic Synthesis*. Pitman Press Ltd., Bath, U.K., 1982, 238247; and C. B. Reese, *Protective Groups in Organic Chemistry*, Ed. J. F. W. McOmie, Plenum Press, London, 1973, pp. 43–143 and 235–308; which are incorporated herein by reference in their entirety.

Although the process of the invention may not produce a reaction product in which all of the active hydrogen groups in a final product are on methylene groups, at least about 80 percent, preferably at least about 85 percent, more preferably at least about 90 percent, and most preferably about 95 percent of the active hydrogen groups are on methylene groups, as determined, for instance, by carbon 13 nuclear magnetic resonance. The exact proportion of active hydrogen groups on methylene groups depends on the structure of the alkylene oxide and the initiator as well as reaction conditions, including catalyst concentration. The number of polyether chains linked by a linking agent and the structure thereof also affect the relative proportion of active hydrogens on methylene groups.

In general, the reaction product is a mixture of compounds, the molecular structures of which are schematically represented by Formula VII in the case of use of an intramolecular protective initiator or Formula VIII in the case of use of an attachment protective initiator:

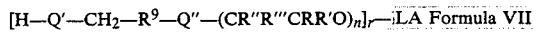

[H—Q'—CH$_2$—R$^9$—Q''—(CR''R'''CRR'O)$_n$]$_r$—LA  Formula VII

OR

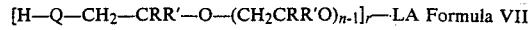

[H—Q—CH$_2$—CRR'—O—(CH$_2$CRR'O)$_{n-1}$]$_r$—LA  Formula VII wherein the symbols are as defined previously except that no more than one of R' and R'' are hydrogen: r is at least 2, Q and Q' are S, O, NH or NR$^a$ (wherein R$^a$ is any aryl, alkyl, aralkyl or cycloalkyl group, preferably having from about 1 to about 25 carbon atoms); and —CH$_2$—R$^9$— is a molecular fragment remaining from a portion of a protective initiator. The fragment —CH$_2$—R$^9$— is preferably an unsubstituted or inertly substituted alkylene or alkyleneoxy molecular fragment having from about 2 to about 10 carbon atoms, more preferably —CH$_2$—R$^9$— is a 1,2-alkyl diol residue such as a propylene glycol residue [—CH$_2$—CH(CH$_3$)—O—], 1,2-butane diol residue, a 1-phenyl-1,2-ethane diol residue or the like. While LA is the residue of any linking agent which links at least two polyether chains according to the process of the invention, LA is preferably an unsubstituted or inertly substituted polyvalent organic molecular fragment (or residue) having from about 1 to about 50 carbon atoms, more preferably LA has from about 1 to about 25 carbon atoms and at least about 2 oxygen, sulfur and/or nitrogen atoms. The term "polyvalent" is used to refer to the presence of more than one linkage to a polyether chain. Preferably, the valence, represented by r, is from about 2 to about 10, more preferably from about 2 to about 5, most preferably from about 2 to about 3.

Polyether active hydrogen compounds prepared by the practice of the invention can be used in a conventional manner to prepare polymers such as polyurethanes and the like. Such polymers may be made using the active hydrogen compounds of the invention according to methods of preparation such as those described in U.S. Pat. Nos. 4,026,836; 3,745,133 and 3,644,232. Active hydrogen compounds prepared by the practice of the invention are also useful in other applications known for active hydrogen compounds such as, in the case of polyols and polythiols, cleaning compositions, hydraulic fluids, surfactants and the like.

Advantageously, for use in preparing polyurethanes and for use in hydraulic fluids, the average equivalent weight of the polyether active hydrogen compounds, particularly polyols and thiols, is from about 200 to about 65000, more preferably from about 900 to about 10000, most preferably from about 900 to about 3500.

The following examples illustrate formation of polyether active hydrogen compounds using protective initiators for polymerization of alkylene oxides, linking the polyethers and converting the protective groups.

EXAMPLE 1: PREPARATION OF A POLYETHER POLYOL HAVING PRIMARY AND SECONDARY HYDROXYL GROUPS (a) Preparation of Catalyst One-half millimole of 5,10,15,20-tetraphenyl 21H-23H-porphyrin commercially available from Aldrich Chemical Co. is placed into a fifty milliliter (mL) round bottomed flask equipped with a three-way stopcock. The flask is purged with dry nitrogen. A syringe is used to add 7 mL of dichloromethane to the porphyrin. After the porphyrin and dichloromethane are stirred using a magnetic stirrer for 5 min. to form a solution, 0.32 mL of a 25 weight percent solution of triethyl aluminum in hexane (a stoichiometric amount of triethyl aluminum relative to the porphyrin) is added to the solution and stirred by a magnetic stirrer for five hours at ambient temperature. During the five hours, a gas (believed to be ethane) is generated and released periodically by syringe. The porphyrin catalyst remains in solution.

(b) Polymerization of Propylene Oxide, Using Benzyl Alcohol as Protective Initiator A syringe is used to add 2.16 g of benzyl alcohol to the flask. The flask contents are stirred at room temperature for 15 hours, during which time pressure is periodically released by quickly opening the stopcock to ambient pressure.

After the 15 hours, a vacuum pump is connected through a dry ice trap to the flask through one opening of the stopcock. The vacuum pump maintains a pressure of about 0.1 to 1 mm Hg, and removes about half of the dichloromethane from the flask over a period of 20 min. Stirring is maintained during the period.

Stirring is continued while 60 millimoles of propylene oxide are added by syringe over a period of 5 min. to the flask. Stirring is continued for three days, after which about 25 mL of a mixture of about 50 weight percent acetone in water is added and stirred for 15 min. The flask is then connected to a rotary evaporator which reduces the pressure in the flask to about 5 mm Hg for a period of about 2 hours and removes volatile compounds leaving a residue of non-volatile compounds.

About 70 mL of hexane are added to the flask and stirred by magnetic stirrer for 15 minutes. A precipitate is noted and removed by filtration through a 5 micron ($\mu$) fritted filter. Then, remaining liquid is mixed with about 1.5 g of activated charcoal and filtered through a 5$\mu$ fritted filter, yielding a filtrate.

The filtrate is placed in a 100 mL. flask under a pressure of about 1 to 5 mm Hg, and the hexane is distilled from the filtrate, leaving a product believed to be poly(propylene oxide) polymer having a secondary hydroxyl group on one end thereof and a benzyl group on the other end thereof.

The molecular weight is determined by gel permeation chromatography of a 0.1 g sample of polymer dissolved in 10 mL of tetrahydrofuran (THF) on a series of Styragel® gel permeation columns, commercially available from Waters Associates to separate molecules by size thereof. The Mn (number average molecular weight) is 1850 (relative to polystyrene standards) and MWD (molecular weight distribution) as defined by the ratio of weight average molecular weight to number average molecular weight (Mw to Mn) is 1.08.

The polymer is analyzed by Fourier Transform infrared (FT-IR) analysis, which shows absorbance at 700 cm$^{-1}$ indicative of carbon-oxygen bonds with aromatic substitution on the carbon atom. The ratio of hydroxyl absorbance at 3300 cm$^{-1}$ to carbon hydrogen stretch at 700 cm$^{-1}$ absorption is 8.9%.

The product is also analyzed by nuclear magnetic resonance spectroscopy of hydrogen ($^1$H-NMR) and, after reaction with trifluoroacetic anhydride, of fluorine 19 ($^{19}$F-NMR). The hydrogen NMR shows peaks at 7.25 PPM and 4.55 PPM, indicating aromatic hydrogens and methylene groups of benzyl groups. The fluorine NMR of the polymer derivatized by trifluoroacetic anhydride shows peaks at 37.6 PPM and 36.9 PPM relative to the standard of monofluorobenzene at 0.0 PPM. Peaks at 37.6 and 36.9 are indicative of secondary hydroxyl groups.

(c) Conversion of the Benzoxy Group to a Hydroxyl Group By Hydrogenolysis

One gram of the poly(propylene oxide) polymer is dissolved in about 40 mL of anhydrous isopropyl alcohol in a 50 mL round bottomed flask for hydrogenolysis. After 5 minutes of stirring with a magnetic stirrer, 0.25 g of a palladium catalyst which is 10% by weight palladium on carbon is added to the solution and stirred to obtain a mixture. The mixture is heated to 65° C. using a heating mantle and maintained at that temperature, with reflux of the alcohol, for a period of 2 days during which vigorous stirring by magnetic stirrer is maintained and hydrogen is bubbled through the mixture at a rate of about 2 mL/min.

After the 2 days, hydrogenolysis is considered complete, and the mixture is filtered through a 5$\mu$ fritted funnel to obtain a filtrate from which volatile compounds are removed by rotary evaporator at a pressure of about 5 mm Hg over a period of 2-3 hours.

Remaining liquid is analyzed by FT-IR, which shows absence of absorbance at 700 cm$^{-1}$, indicative of carbon-oxygen stretch where the carbon atom is attached to an unsaturated group such as a benzene ring: such absence indicates removal of the benzyl group. The ratio of hydroxyl absorbance at 3100–2500 cm$^{-1}$ to carbon-oxygen stretch at 680–750 cm$^{-1}$ is changed from 8.9% before hydrogenolysis to 17.7% after hydrogenolysis, indicating an increase in the relative proportion of hydroxyl groups in the molecules after hydrogenolysis. Such an increase is consistent with removal of a benzyl group during hydrogenolysis.

The liquid is also analyzed by nuclear magnetic resonance spectroscopy (NMR). The hydrogen NMR shows no peaks at 7.25 PPM or 4.55 PPM, indicating absence of aromatic hydrogens and methylene hydrogen atoms of benzyl groups. The fluorine NMR of the liquid derivatized by trifluoroacetic anhydride shows peaks at 37.9, 37.6 PPM and 36.9 PPM relative to the standard of monofluorobenzene at 0.0 PPM. The peak at 37.9 indicates that primary hydroxyl groups are present in the liquid. A ratio of the integrations of the peaks corresponding to primary and secondary hydroxyl groups indicates a ratio of about 15:17 after hydrogenolysis. Such a ratio is consistent with about half primary and half secondary hydroxyl groups.

A gel permeation chromatography curve of the liquid is the same shape of that of the material before hydrogenolysis, indicating the same MWD of 1.08.

This example demonstrates the use of benzyl alcohol as an attachment protective initiator for polymerization of propylene oxide using a porphyrin as a catalyst and subsequent removal of the benzyl group to yield a polyether polyol having primary hydroxyl groups on the termini from which the benzyl group is removed. A polyol having a very high percentage of primary hydroxyl groups could be prepared by linking polyether chains produced in the polymerization, before hydrogenolysis of the benzyl group.

EXAMPLE 2: PREPARATION OF A POLYETHER POLYOL HAVING PRIMARY HYDROXYL GROUPS USING AN ATTACHMENT PROTECTIVE INITIATOR

This example illustrates the use of benzyl alcohol as an attachment protective initiator to initiate polymerization of propylene oxide using a porphyrin as a catalyst, use of terephthaloyl chloride as a linking agent and subsequent removal of the benzyl groups to yield a polyether polyol (diol) having primary hydroxyl groups at both termini.

(a) Polymerization of Propylene Oxide Using Benzyl Alcohol as Protective Initiator and a Porphyrin Catalyst The process of Example 1 is repeated using one-half millimole of 5,10,15,20-tetraphenyl 21H-23H-porphyrin catalyst, 2 millimoles of benzyl alcohol and 30 millimoles of propylene oxide to produce a polyether alcohol having a benzyl ether group at one terminus and secondary hydroxyl group at the distal terminus. The polyether also has a number average molecular weight of 823 grams per mole as measured by titration with phthalic anhydride.

(b) Linking Poly(propylene oxide) Chains Using Terephthaloyl Chloride as Linking Agent Ten and two tenths gram of tetrahydrofuran (THF), 3.12 g terephthaloyl chloride and 0.58 g triethylamine are added to 7.67 g of the polyether in a 3-neck 250 mL round bottom flask to form a mixture. The mixture is maintained at 50° C. with stirring for 4 hours, after which volatiles are removed under approximately 0.5 mm Hg vacuum, leaving a viscous liquid residue. The residue is washed three times with 25 mL portions of hexane. The hexane is removed in-vacuo, leaving a product.

A 0.1 g sample of the product is dissolved in 10 mL THF and analyzed by gel permeation chromatography to confirm that linking has occurred. Linking is indicated by a decrease in observed retention time indicating an increase in molecular weight. Infrared spectroscopy shows peaks corresponding to the regions which are indicative of ester linkages and benzyl groups, indicating that terephthaloyl esters are formed and the product also has benzyl groups.

(c) Conversion of Benzyl Groups to Hydroxyl Groups

As in Example 1, the benzyl groups are removed by hydrogenolysis to yield a product which is purified by filtration and rotary evaporation. Analysis of the hydrogenolysis product by the procedures described in Example 1 is consistent with removal of benzyl groups and increased relative proportion of hydroxyl groups. The $^{13}$C NMR of the product indicates that about 87 percent of the hydroxyl groups in the product are primary hydroxyl groups.

EXAMPLE 3: PREPARATION OF A POLYETHER POLYOL HAVING PRIMARY HYDROXYL GROUPS USING AN INTRAMOLECULAR PROTECTIVE INITIATOR

This example illustrates the use of the product of triphenylmethyl chloride and propylene glycol as an intramolecular protective initiator used to initiate polymerization of propylene oxide using potassium hydroxide as a catalyst, use of toluene diisocyanate as a linking agent and subsequent removal of the triphenylmethyl groups to yield a polyether polyol (diol) having primary hydroxyl groups at both termini.

(a) Preparation of an Intramolecular Protective Initiator

Fifteen grams of triphenylmethyl chloride and 3.2 g propylene glycol are placed in a 250 mL round bottom flask and heated to 125° C. for 1 hour to yield a solid product. The product is dissolved in deuterotoluene and analyzed by $^{13}$C nuclear magnetic resonance spectroscopy ($^{13}$C NMR) and is shown to have a structure consistent with 1-triphenylmethoxy-2-propanol.

(b) Polymerization of Propylene Oxide Using the Intramolecular Protective Initiator and a Potassium Hydroxide Catalyst Five grams of the product are melted and transferred to a glass reaction vessel. Then, 25 g of propylene oxide and 0.3 g potassium hydroxide are added to the product to form a mixture. The vessel is sealed and placed in a steam autoclave at 120° C. for 60 hours, after which the mixture is removed and cooled to ambient temperature. Then the mixture is filtered through magnesium silicate to yield a viscous liquid polyether. A 0.1 g sample of the polyether is dissolved in 10 mL of THF and analyzed by gel permeation chromatography as in Example 1. The number average molecular weight is 1850 with a molecular weight distribution of 1.06.

(c) Linking of Poly(propylene oxide) Molecules Using Toluene Diisocyanate

A 325 g sample of the polyether is dried under vacuum at 120° C. for 2 hours. A 15.4 g sample of toluene diisocyanate is then added by syringe to the polyether to form a mixture. The mixture is stirred at ambient temperature for 18 hours. Remaining volatile materials are removed in-vacuo to leave a product.

(d) Conversion of the Triphenylmethoxy Groups to Hydroxyl Groups

A 3 g sample of the product is dissolved in 10 mL methanol. Three mL glacial acetic acid and 1.0 mL water are added to the sample to form a mixture. The mixture is stirred vigorously for 2 hours at 35° C. to yield a liquid. The liquid is then subjected to vacuum at 100° C. for 2 hours to remove water.

A neat sample of the liquid is analyzed by $^{13}$C NMR, using tetramethyl silane as a standard. The NMR spectrum shows a structure consistent with a polyether polyol having primary hydroxyl end groups and no triphenylmethyl ether groups. The spectrum indicates that about 93 percent of the hydroxyl groups in the product are primary hydroxyl groups.

We claim:

1. A process for producing a polyether active hydrogen compound having at least two active hydrogen groups on primary carbon atoms per molecule comprising (a) forming polyoxyalkylene molecules each having at least one active hydrogen precursor group, by exposing a reaction mixture containing at least one 1,2-epoxyalkane and at least one protective initiator to conditions effective for the polymerization of the 1,2-epoxyalkane; (b) linking at least two of the polyoxyalkylene molecules using a linking agent to form a linked molecule having at least two termini each having an active hydrogen precursor group thereon; and (c) cleaving or transforming the active hydrogen precursor groups at said termini of the linked molecule to form active hydrogen groups on primary carbon atoms by means of reduction, hydrogenation, acidification, hydrogenolysis, hydrolysis, or oxidation.

2. The process of claim 1 wherein the conditions effective for polymerization of the 1,2-epoxyalkane include presence of a catalyst.

3. The process of claim 2 wherein the catalyst is an alkali or alkaline earth metal hydroxide, alkali or alkaline earth metal alkoxide or a porphyrin complex catalyst.

4. The process of claim 3 wherein the catalyst is an alkali or alkaline earth metal hydroxide or alkali or alkaline earth metal alkoxide.

5. The process of claim 4 wherein the catalyst is an alkali metal hydroxide.

6. The process of claim 3 wherein the catalyst is a porphyrin complex catalyst.

7. The process of claim 1 wherein the active hydrogen groups on primary carbon atoms are hydroxy or thiol groups.

8. The process of claim 7 wherein the protective initiator is selected from the group consisting of unsubstituted or inertly substituted phenols, unsubstituted or inertly substituted alcohols, unsubstituted or inertly substituted thiols or unsubstituted or inertly substituted thiophenols.

9. The process of claim 8 wherein the protective initiator is an unsubstituted or inertly substituted alcohol.

10. The process of claim 9 wherein the protective initiator is selected from the group consisting of unsubstituted or inertly substituted benzyl alcohols, triphenyl methyl alcohol or t-butyl alcohol.

11. The process of claim 9 wherein the protective initiator is 1-triphenylmethoxy-2-propanol.

12. The process of claim 10 wherein the protective initiator is an unsubstituted or inertly substituted benzyl alcohol.

13. The process of claim 12 wherein the protective initiator is benzyl alcohol.

14. The process of claim 7 wherein the protective initiator is an intramolecular protective initiator which is the reaction product of an active carbon compound or active silicon compound selected from the group consisting of triarylmethyl halides, triaryl silyl halides and tertiary butyl halides: and a polyfunctional active hydrogen compound having at least one primary active hydrogen group.

15. The process of claim 14 wherein the polyfunctional active hydrogen compound is selected from the group consisting of diols, triols, dithiols, trithiols, alkanolamines and mixtures thereof.

16. The process of claim 15 wherein the polyfunctional active hydrogen compound is a diol or triol selected from the group consisting of glycols and glycerine.

17. The process of claim 1 wherein the 1,2-epoxyalkane is a substituted 1,2-epoxyalkane.

18. The process of claim 17 wherein the 1,2-epoxyalkane is selected from the group consisting of propylene oxide, 1,2-butylene oxide and mixtures thereof.

19. The process of claim 1 wherein the 1,2-epoxyalkane comprises from about 1 to about 30 weight percent ethylene oxide based on total weight of 1,2-epoxyalkanes.

20. The process of claim 1 wherein the linking agent has from two to about ten functional groups reactive with the polyoxyalkylene molecules.

21. The process of claim 20 wherein the linking agent is selected from the group consisting of polyfunctional isocyanate compounds, phosgene and polyfunctional acid halides.

22. The process of claim 1 wherein the polyether active hydrogen compound is a polyether having hydroxyl groups, at least 90 mole percent of the hydroxyl groups being primary hydroxyl groups.

23. The process of claim 21 wherein the polyether polyol has less than about 0.2 milliequivalent per gram of unsaturation.

24. A process for producing a polyether active hydrogen compound having at least two terminal active hydrogen groups on primary carbon atoms per molecule comprising (a) forming polyoxyalkylene molecules each having at least one active hydrogen precursor group, by exposing a reaction mixture comprising at least one substituted alkylene oxide and at least one intramolecular protective initiator having a functional group convertible into an active hydrogen group on a primary carbon atom to conditions effective for the polymerization of the substituted alkylene oxide; (b) linking at least two of the polyoxyalkylene molecules using a linking agent to form a linked molecule having at least two termini each having an active hydrogen precursor group thereon; and (c) cleaving or transforming the active hydrogen precursor groups at said termini of the linked molecule to form active hydrogen groups on primary carbon atoms by means of reduction, hydrogenation, acidification, hydrogenolysis, hydrolysis, or oxidation.

25. The process of claim 24 wherein the conditions effective for polymerization of the substituted alkylene oxide include presence of a catalyst selected from the group consisting of alkali or alkaline earth metal hydroxides, alkali or alkaline earth metal alkoxides and porphyrin complex catalysts.

26. The process of claim 24 wherein the polyfunctional active hydrogen compound is selected from the group consisting of diols, triols, dithiols, trithiols, alkanolamines and mixtures thereof.

27. The process of claim 24 wherein the polyfunctional active hydrogen compound is a diol or triol selected from the group consisting of glycols and glycerine.

28. The process of claim 24 wherein the substituted alkylene oxide has no methylene group.

29. The process of claim 24 wherein in the reaction mixture, there is additionally present from about 1 to about 30 percent by weight ethylene oxide based on combined weight of substituted alkylene oxide and ethylene oxide.

30. The process of claim 24 wherein the step of converting the protective group into an active hydrogen group is a process of cleavage of a protective group from an oxygen, nitrogen or sulfur atom to leave an active hydrogen group by a process selected from the group consisting of reduction, hydrogenation, hydrogenolysis, hydrolysis, acidification, or oxidation.

* * * * *